Oct. 24, 1939.   H. R. RENNER   2,177,305
COMBINED FUEL CONTROL AND BRAKE PEDAL FOR AUTOMOBILES
Filed Sept. 27, 1937
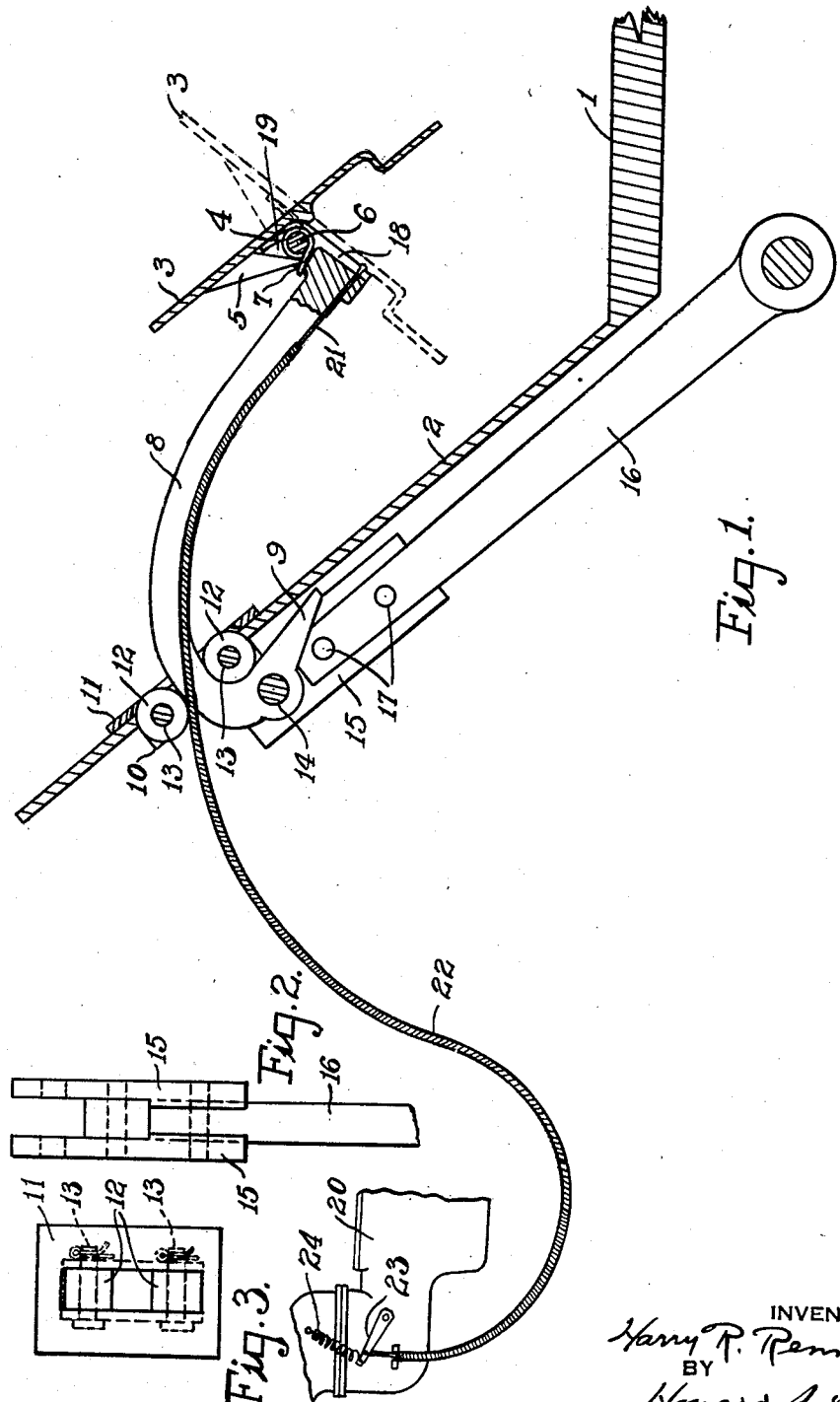
INVENTOR
Harry R. Renner,
BY
Howard S. Smith
ATTORNEY Patented Oct. 24, 1939

2,177,305

UNITED STATES PATENT OFFICE 2,177,305

COMBINED FUEL CONTROL AND BRAKE PEDAL FOR AUTOMOBILES

Harry R. Renner, Pleasant Hill, Ohio

Application September 27, 1937, Serial No. 165,936

8 Claims. (Cl. 192—3)

This invention relates to new and useful improvements in a combined fuel control and brake pedal for automobiles.

It is one of the principal objects of my invention to provide simple and effective means for combining the motor speed control of an automobile with the braking thereof.

Another object of my invention is to promote safety in driving by making it possible through my device to effect a much quicker stop than is possible with the present type of brake equipment. Furthermore, its operation is more or less involuntary, because with the foot on the acceleration pedal, there is a tendency to press further on that pedal when an emergency stop is desired. When my device is employed, however, pressure of the whole foot upon the accelerator pedal will automatically bring the brake into operative connection with that pedal, not only to effect braking action but to reduce the flow of fuel to the intake manifold. Thus a quick stop is accomplished by the application of full forward pressure to the accelerator pedal, whereas acceleration alone is effected by the tilting of the upper end of the pedal by the toe portion of the foot.

Other important and incidental objects will be brought out in the following specification and particularly set forth in the subjoined claims.

In the accompanying drawing illustrating my invention, Figure 1 is a side elevational view, partly in section, of my combined fuel control and brake pedal applied to an automobile. Figure 2 is a top plan view of the free end of the brake pedal, showing the means carried thereby to receive the brake pedal actuating arm. And Figure 3 is a top plan view of the roller structure which guides the inner end of said arm downwardly.

Referring to the accompanying drawing for a detailed description of the form of embodiment of my invention illustrated therein, the numeral 1 designates the conventional floor board of an automobile, and having an upwardly inclined portion 2.

The numeral 3 designates the conventional accelerator foot pedal or control means which is maintained by a spring 4 in its normal, inoperative position as indicated by the dotted lines in Figure 1. This foot pedal 3 has downwardly projecting web portions 5, of which one is shown in Figure 1. These web portions are mounted for a tilting movement on a transverse pivot pin 6 carried by a vertical projection 7 on the outer end of an arm 8, comprising a part of the brake operating means.

The arm 8 is curved to substantially hook shape at its inner portion, terminating in a tapering inner end 9. The curved end of this arm 8 is free to be moved downwardly through an opening in the inclined portion 2 of the floor board 1. Into this opening is fitted guide means comprising a slotted roller-carrier bracket 10 having a flat top 11 formed with a central slot through which the curved portion of the arm 8 projects, and carrying transverse rollers 12, 12 mounted on pintles 13, 13 respectively secured in said bracket. These rollers 12 are in engagement with the curved portion of the arm 8 to guide it downwardly when full forward pressure is applied to the foot pedal 3.

The inner tapered end 9 of the arm is pivotally secured by a pin 14 between two plates 15, 15 secured to the sides of the free end of a conventional brake arm 16 by bolts 17, 17. This brake arm has the pedal portion removed and the remaining end beveled to conform to the taper of the inner end 9 of the arm 8. The two side plates 15, 15 are recessed along the line of this taper to restrain a turning movement of the end 9 of the arm 8 about its pivot 14 when full forward pressure is exerted upon the foot pedal 3.

Also mounted for a tilting movement upon the pin 6 is an accelerator arm or lever 18, comprising a part of the throttle operating means having an enlarged head portion 19 for engagement by the foot pedal 3 when the latter is tilted by the toe portion of the foot, to open a throttle valve, controlling the flow of carburized fuel from the carburetor 20, through a wire 21. This wire, which is movable through a flexible housing 22, is connected at one end to the lower end of the accelerator arm 18 and at its other end to the throttle lever 23 of the carburetor. The throttle lever 23 is normally maintained in the closed position shown in Figure 1 by a tension spring 24.

In operation, when the driver places his foot against the foot pedal 3 and tilts it with the toe portion of that foot, the upper enlarged end 19 of the accelerator arm 18 will be engaged by that pedal and tilted with it to progressively open the throttle valve of the carburetor through an outward movement of the wire 21. Now, when the full forward pressure of the foot through its toe, ball and heel portions is exerted against the foot pedal 3, it will first be tilted toward its dotted line position to permit the spring 24 to draw the throttle lever 23 to its closed position. At the same time continued forward foot pressure applied to the pedal 3 will force it downwardly to actuate the brake pedal 16 to retard the movement of the car, effecting a quick stop if necessary. Thus it is seen that my device is particularly useful in an emergency to close the fuel throttle and actuate the brake in one operation.

This invention is adapted to actuate any brake control means and to control the supply of motor energy from any power source.

Having described my invention, I claim:

1. In an automobile, a carburetor, a throttle lever in the latter, a spring for drawing said lever to a closed position, a brake pedal, a floor board formed with an opening, a pair of guide rollers below said opening, an arm having a curved portion downwardly movable through said opening and between said guide rollers, means connecting the lower end of said arm with said brake pedal, an accelerator pedal pivotally connected to the upper end of said arm, a flexible element connected at one end to said throttle lever, and means connecting the other end of said flexible element to the accelerator pedal to exert a pull upon said lever to draw the same to an open position when the toe portion of said accelerator pedal is tilted downwardly, said means releasing tension on said flexible element to permit said spring to draw said throttle lever to a closed position when the accelerator pedal is tilted in a reverse direction and said latter pedal is moved forwardly as a unit to force the curved arm downwardly between said rollers to actuate the brake pedal.

2. In a device of the class described, in combination, brake operating means, throttle operating means, comprising a lever pivotally connected to said brake operating means, and control means common to both of said means and pivotally supported by one of said means, said lever comprising a part coacting with said control means when the latter is in one position whereby the throttle operating means may be actuated by said control means, and said control means being pivotally shiftable to another position for actuation of said brake operating means and out of coaction with said throttle operating means.

3. In a device of the class described, in combination, brake operating means, throttle operating means comprising a flexible part associated with said brake operating means and movable relative thereto, and a lever pivotally connected to said brake operating means, and control means common to both of said means and pivotally supported by said brake operating means, said lever being operatively connected with said flexible part and comprising a part co-acting with said control means when the latter is in one position whereby the throttle operating means may be actuated by said control means, and said control means being pivotally shiftable to another position for actuation of said brake operating means and out of co-action with said throttle operating means.

4. In a device of the class described, in combination, a floor board formed with an opening, brake operating means comprising a curved arm extending through said opening in a direction substantially parallel to said floor board, throttle operating means, and control means common to both of said means, pivotally supported by one of said means, and normally positioned substantially parallel to said floor board for actuation of said throttle operating means, said control means being pivotally shiftable to a position out of cooperation with said throttle operating means for causing movement of said arm downwardly upon application of pressure forwardly to said control means.

5. In a device of the class described, in combination, a floor board formed with an opening, brake operating means comprising a curved arm extending through said opening in a direction substantially parallel to said floor board, guide means secured to said floor board and cooperating with said arm for facilitating downward movement thereof, throttle operating means, and control means common to said brake operating means and said throttle operating means, pivotally supported by one of said means and normally positioned substantially parallel to said floor board for actuation of said throttle operating means, said control means being pivotally shiftable to a position out of cooperation with said throttle operating means for causing movement of said arm downwardly upon application of pressure forwardly to said control means.

6. In a device of the class described, in combination, a floor board formed with an opening, brake operating means comprising a curved arm extending through said opening in a direction substantially parallel to said floor board, and a second arm pivotally connected to said curved arm at a point below said floor board, said arms being provided with cooperating means for preventing relative pivotal movement thereof in one direction, throttle operating means, and control means common to said brake operating means and said throttle operating means, pivotally supported by one of said means, and normally positioned substantially parallel to said floor board for actuation of said throttle operating means, said control means being pivotally shiftable to a position out of cooperation with said throttle operating means for causing movement of said curved arm downwardly upon application of pressure forwardly to said control means.

7. In a device of the class described, in combination, a floor board formed with an opening, brake operating means comprising a curved arm extending through said opening in a direction substantially parallel to said floor board, and a second arm pivotally connected to said curved arm at a point below said floor board, said curved arm having a tapered extension and said second arm being provided with recessed portions cooperating therewith whereby relative pivotal movement of said arms in one direction is prevented, throttle operating means, and control means common to said brake operating means and said throttle operating means, pivotally supported by one of said means, and normally positioned substantially parallel to said floor board for actuation of said throttle operating means, said control means being pivotally shiftable to a position out of cooperation with said throttle operating means for causing movement of said curved arm downwardly upon application of pressure forwardly to said control means.

8. A device as claimed in claim 5 wherein the guide means comprises roller members.

HARRY R. RENNER.